United States Patent
Moulton et al.

[11] Patent Number: 5,910,237
[45] Date of Patent: Jun. 8, 1999

[54] PROCESS FOR RECOVERING ORGANIC HYDROXIDES FROM WASTE SOLUTIONS

[75] Inventors: Roger D. Moulton; Mark W. Hellums, both of Austin, Tex.

[73] Assignee: Sachem, Inc., Austin, Tex.

[21] Appl. No.: 08/815,382

[22] Filed: Mar. 11, 1997

[51] Int. Cl.$^6$ .............................. B01D 61/44; B01D 17/06
[52] U.S. Cl. .......................... 204/541; 204/522; 204/530; 204/537; 205/703
[58] Field of Search ..................................... 205/688, 703, 205/746, 747, 748, 749; 204/522, 537, 530, 541

[56] References Cited

U.S. PATENT DOCUMENTS

| | | | |
|---|---|---|---|
| 4,714,530 | 12/1987 | Hale et al. | 204/131 |
| 4,931,155 | 6/1990 | Dutcher et al. | 204/72 |
| 5,316,679 | 5/1994 | Bruening | 210/634 |
| 5,354,434 | 10/1994 | Satoh et al. | 204/72 |
| 5,389,211 | 2/1995 | Sharifian et al. | 204/72 |
| 5,405,508 | 4/1995 | Kawakami et al. | 204/102 |

FOREIGN PATENT DOCUMENTS

| | | |
|---|---|---|
| 0597460 | 5/1994 | European Pat. Off. . |
| 59-193289 | 11/1984 | Japan . |
| 4228587 | 8/1992 | Japan . |
| 5106074 | 4/1993 | Japan . |
| 7328642 | 12/1995 | Japan . |

OTHER PUBLICATIONS

International Search Report for PCT Patent Application Serial No. PCT/US98/02344 mailed Jun. 23, 1998.

*Primary Examiner*—Kathryn Gorgos
*Assistant Examiner*—Thomas H. Parsons
*Attorney, Agent, or Firm*—Renner, Otto, Boisselle & Sklar, P.L.L.

[57] ABSTRACT

In one embodiment, the present invention relates to a process for recovering organic hydroxide from contaminated solutions containing the organic hydroxide and impurities including charging the contaminated solution to a first electrochemical cell containing at least two compartments, a cathode, an anode and a size selective divider and passing a current through the first electrochemical cell whereby impurities migrate through the size selective divider; recovering a second solution containing organic ions from the first electrochemical cell and charging the second solution to a second electrochemical cell containing at least two compartments, a cathode, an anode and a divider and passing a current through the second electrochemical cell whereby the organic hydroxide is purified; and recovering the organic hydroxide from the second electrochemical cell. In another embodiment, the present invention relates to a process for recovering onium hydroxide from contaminated solutions containing the onium hydroxide and impurities including forming a first solution containing an onium salt and impurities from the contaminated solution; contacting the first solution with a size selective membrane under pressure, wherein at least a portion of the impurities pass through the size selective membrane thereby providing a second solution containing an onium salt and a decreased amount of impurities; charging the second solution to an electrochemical cell containing at least two compartments, a cathode, an anode and a divider and passing a current through the cell whereby the onium hydroxide is purified; and recovering the onium hydroxide from the cell.

22 Claims, 2 Drawing Sheets

PROCESS FOR RECOVERING ORGANIC HYDROXIDES FROM WASTE SOLUTIONS

TECHNICAL FIELD

This invention relates to a process for recovering organic hydroxides from contaminated solutions. In particular, the invention relates to a process for recovering organic hydroxides including a step involving either a size selective divider or membrane and a step involving an electrochemical cell.

BACKGROUND OF THE INVENTION

Quaternary ammonium hydroxides such as tetramethylammonium hydroxide (TMAH) and tetraethylammonium hydroxide (TEAH) are strong organic bases that have been known for many years. Such quaternary ammonium hydroxides have found a variety of uses including use as a titrant for acids in organic solvents and as a supporting electrolyte in polarography. Aqueous solutions of quaternary ammonium hydroxides, particularly TMAH solutions, have been used extensively as a developer for photoresists in printed circuit board and microelectronic chip fabrication. For a variety of reasons, it is desirable to minimize the overall amount of developer used in printed circuit board and microelectronic chip fabrication. One way to minimize the overall amount of hydroxide developer is to reuse the waste developer. Reusing developer reduces the amount lost and decreases disposal problems.

However, waste developer contains impurities including ionic impurities and nonionic impurities. Ionic impurities include cations such as sodium, potassium, zinc and calcium; and anions such as halides, nitrates, nitrites, carbonates, carboxylates, sulfates. Nonionic impurities include photoresists, surfactants, amines and numerous other organic molecules. Waste developer also contains relatively low concentrations of the hydroxide developer. Accordingly, there remains a continuing need to effectively recover hydroxide developer in a useable form so that it may be reused thereby minimizing the overall amount of developer used in printed circuit board and microelectronic chip fabrication.

U.S. Pat. No. 4,714,530 (Hale et al) describes an electrolytic process for preparing high purity quaternary ammonium hydroxides which utilizes a cell containing a catholyte compartment and an anolyte compartment separated by a cation-exchange membrane. The process comprises charging an aqueous solution of a quaternary ammonium hydroxide to the anolyte compartment, adding water to the catholyte compartment, and passing a direct current through the electrolysis cell to produce a higher purity quaternary ammonium hydroxide in the catholyte compartment which is subsequently recovered. The '530 patent also describes an improvement which comprises heating the quaternary ammonium hydroxide at an elevated temperature prior to charging the hydroxide to the anolyte compartment of the electrolytic cell.

U.S. Pat. No. 4,938,854 (Sharifian et al) also describes an electrolytic process for purifying quaternary ammonium hydroxides by lowering the latent halide content. The electrolytic cell may be divided into an anolyte compartment and a catholyte compartment by a divider which may be an anion or cation selective membrane. The cathode in the catholyte compartment comprises zinc, cadmium, tin, lead, copper or titanium, or alloys thereof, mercury or mercury amalgam.

Japanese Kokai Patent No. 60-131985 (1985) (Takahashi et al) describes a method of manufacturing a high purity quaternary ammonium hydroxide in an electrolysis cell which is divided into an anode chamber and a cathode chamber by a cation exchange membrane. A quaternary ammonium hydroxide solution containing impurities is charged to the anode chamber and a direct current is supplied between two electrodes after water has been charged to the cathode chamber. Purified quaternary ammonium hydroxide is obtained from the cathode chamber. The purified quaternary ammonium hydroxide contains reduced amounts of alkali metals, alkaline earth metals, anions, etc.

SUMMARY OF THE INVENTION

In one embodiment, the present invention relates to a process for recovering organic hydroxide from contaminated solutions containing the organic hydroxide and impurities including charging the contaminated solution to a first electrochemical cell containing at least two compartments, a cathode, an anode and a size selective divider and passing a current through the first electrochemical cell whereby impurities migrate through the size selective divider; recovering a second solution containing organic ions from the first electrochemical cell and charging the second solution to a second electrochemical cell containing at least two compartments, a cathode, an anode and a divider and passing a current through the second electrochemical cell whereby the organic hydroxide is purified; and recovering the organic hydroxide from the second electrochemical cell.

In another embodiment, the present invention relates to a process for recovering onium hydroxide from contaminated solutions containing the onium hydroxide and impurities including metal ion impurities including charging the contaminated solution to a first electrochemical cell containing at least two compartments, a cathode, an anode and a size selective cation selective membrane and passing a current through the first electrochemical cell whereby metal ion impurities migrate through the size selective cation selective membrane; recovering a second solution containing onium ions from the first electrochemical cell and charging the second solution to a second electrochemical cell containing at least two compartments, a cathode, an anode and a divider and passing a current through the second electrochemical cell whereby the onium hydroxide is purified; and recovering the onium hydroxide from the second electrochemical cell.

In yet another embodiment, the present invention relates to a process for recovering onium hydroxide from contaminated solutions containing the onium hydroxide and impurities including forming a first solution containing an onium salt and impurities from the contaminated solution; contacting the first solution with a size selective membrane under pressure, wherein at least a portion of the impurities pass through the size selective membrane thereby providing a second solution containing an onium salt and a decreased amount of impurities; charging the second solution to an electrochemical cell containing at least two compartments, a cathode, an anode and a divider and passing a current through the cell whereby the onium hydroxide is purified; and recovering the onium hydroxide from the cell.

As a result of the processes of the claimed invention, recycled solutions of organic hydroxides can be obtained in which the concentration and purity is increased. Recycling spent solutions of organic hydroxides provides not only cost savings, but also environmental benefits by eliminating the need for synthesizing new hydroxide compound solutions and associated expensive purification processes and reducing the toxicity of waste solution effluents. An increased amount of water can be recovered after organic hydroxides are removed from solution. Additionally, it is not necessary to store large amounts of chemicals. The relatively high concentration and purity of organic hydroxide solutions obtainable via the present invention can effectively be used in numerous applications where organic hydroxide solutions are required.

DESCRIPTION OF THE PREFERRED EMBODIMENTS

Figures 1, 2:
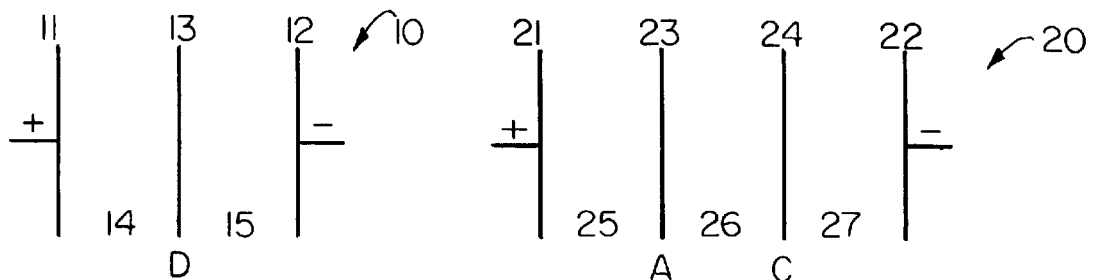
FIG. 1 is a schematic representation of a two compartment electrochemical cell containing one unit cell in accordance with the present invention.
FIG. 2 is a schematic representation of a three compartment electrochemical cell in accordance with the invention.

The organic hydroxides may generally be characterized by the formula $$A(OH)_x \qquad (I)$$

wherein A is an organic group and x is an integer equal to the valence of A. In one embodiment, the hydroxide compound should be sufficiently soluble in a solution such as water, alcohol or other organic liquid, or mixtures thereof to allow a useful recovery rate.

In another embodiment the process of the present invention is useful in preparing purified organic hydroxide compounds such as quaternary ammonium hydroxides, quaternary phosphonium hydroxides and tertiary sulfonium hydroxides. These organic hydroxides may be collectively referred to as onium hydroxides. In this and other embodiments, A in Formula (I) above is an onium compound, and Formula (I) represents an onium hydroxide.

The quaternary ammonium and quaternary phosphonium hydroxides may be characterized by the formula

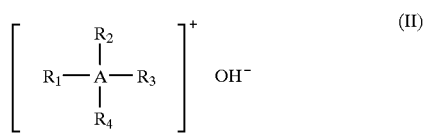

wherein A is a nitrogen or phosphorus atom, $R_1$, $R_2$, $R_3$ and $R_4$ are each independently alkyl groups containing from 1 to about 20 carbon atoms, hydroxy alkyl or alkoxy alkyl groups containing from 2 to about 20 carbon atoms, aryl groups, or hydroxy aryl groups, or $R_1$ and $R_2$ together with A may form a heterocyclic group provided that if the heterocyclic group contains a C=A group, $R_3$ is the second bond.

The alkyl groups $R_1$ to $R_4$ may be linear or branched, and specific examples of alkyl groups containing from 1 to 20 carbon atoms include methyl, ethyl, propyl, butyl, pentyl, hexyl, heptyl, octyl, isooctyl, nonyl, decyl, isodecyl, dodecyl, tridecyl, isotridecyl, hexadecyl and octadecyl groups. $R_1$, $R_2$, $R_3$ and $R_4$ also may be hydroxyalkyl groups such as hydroxyethyl and the various isomers of hydroxypropyl, hydroxybutyl, hydroxypentyl, etc. In one preferred embodiment, $R_1$–$R_4$ are independently alkyl groups containing one to ten carbon atoms and hydroxyalkyl groups containing from two to three carbon atoms. Specific examples of alkoxyalkyl groups include ethoxyethyl, butoxymethyl, butoxybutyl, etc. Examples of various aryl and hydroxyaryl groups include phenyl, benzyl, and equivalent groups wherein benzene rings have been substituted with one or more hydroxy groups.

The quaternary ammonium hydroxides which can be recycled or purified in accordance with the process of the present invention may be represented by Formula III

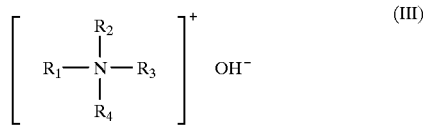

wherein $R_1$–$R_4$ are as defined in Formula II. In one preferred embodiment, $R_1$–$R_4$ are alkyl groups containing from 1 to about 4 carbon atoms and hydroxyalkyl groups containing 2 or 3 carbon atoms. Most often the quaternary ammonium hydroxides purified in accordance with the process of the invention will be tetramethylammonium hydroxide (TMAH) or tetraethylammonium hydroxide (TEAH). Specific examples of other such hydroxides include tetramethylammonium hydroxide, tetraethylammonium hydroxide, tetrapropylammonium hydroxide, tetrabutylammonium hydroxide, tetra-n-octylammonium hydroxide, trimethylhydroxyethylammonium hydroxide, trimethylmethoxyethylammonium hydroxide, dimethyldihydroxyethylammonium hydroxide, methyltrihydroxyethylammonium hydroxide, phenyltrimethylammonium hydroxide, phenyltriethylammonium hydroxide, benzyltrimethylammonium hydroxide, benzyltriethylammonium hydroxide, dimethylpyrolidinium hydroxide, dimethylpiperidinium hydroxide, diisopropylimidazolinium hydroxide, N-alkylpyridinium hydroxide, etc.

Examples of quaternary phosphonium hydroxides representative of Formula II wherein A=P which can be purified in accordance with the process of the present invention include tetramethylphosphonium hydroxide, tetraethylphosphonium hydroxide, tetrapropylphosphonium hydroxide, tetrabutylphosphonium hydroxide, trimethylhydroxyethylphosphonium hydroxide, dimethyldihydroxyethylphosphonium hydroxide, methyltrihydroxyethylphosphonium hydroxide, phenyltrimethylphosphonium hydroxide, phenyltriethylphosphonium hydroxide and benzyltrimethylphosphonium hydroxide, etc.

In another embodiment, the tertiary sulfonium hydroxides which can be recycled or purified in accordance with this invention may be represented by the formula

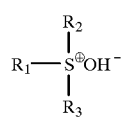 (IV)

wherein $R_1$, $R_2$ and $R_3$ are each independently alkyl groups containing from 1 to about 20 carbon atoms, hydroxy alkyl or alkoxy alkyl groups containing from 2 to about 20 carbon atoms, aryl groups, or hydroxy aryl groups, or $R_1$ and $R_2$ together with S may form a heterocyclic group provided that if the heterocyclic group contains a C=S group, $R_3$ is the second bond.

Examples of the tertiary sulfonium hydroxides represented by Formula IV include trimethylsulfonium hydroxide, triethylsulfonium hydroxide, tripropylsulfonium hydroxide, etc.

The contaminated solutions containing organic hydroxides which are purified or recycled in accordance with the process of the present invention are mixtures, preferably solutions, containing an oxidizable liquid and from about 0.01% to about 50% by weight of the organic hydroxide and generally will contain varying amounts of one or more undesirable impurities, for example, anions such as halide, carbonate, formate, nitrite, nitrate, sulfate, etc., some cations such as metals including zinc and calcium, sodium, potassium and some neutral species such as photoresists, methanol, amines, etc. The oxidizable liquid may be water, mixtures of water and an organic liquid such as an alcohol and the like.

In one embodiment, the process of the present invention is effective in reducing the amount of both ionic and nonionic impurities present in solutions of organic hydroxides such as quaternary ammonium hydroxides. In a further embodiment, the process of the present invention results in a reduction of metal ion impurities as well as organic impurities in a solution of an organic hydroxide compound such as quaternary ammonium hydroxide.

Organic hydroxides are commercially available. Additionally, organic hydroxides can be prepared from the corresponding organic salts such as the corresponding organic halides, carbonates, formates, sulfates and the like. Various methods of preparation are described in U.S. Pat. Nos. 4,917,781 (Sharifian et al) and 5,286,354 (Bard et al) which are hereby incorporated by reference. There is no particular limit as to how the organic hydroxide is obtained or prepared.

In accordance with the process of the present invention, the organic hydroxides such as those described above are purified or recycled from a contaminated solution in a process including a precipitating step.

A contaminated solution may be a solution of an organic hydroxide after it has been used in a process, especially in developing processes associated with printed circuit board and microelectronic chip fabrication. As a result of the process, impurities enter and contaminate the solution. In other words, the contaminated solution may be a spent solution of an organic hydroxide. In addition to the organic hydroxide, the contaminated solution may contain any of the impurities described above and/or organic salts corresponding to the organic hydroxide and/or other particulates. Organic salts corresponding to the organic hydroxide generally include onium salts and specifically organic halogens such as organic chlorides, organic nitrates, organic sulfates, organic phosphates, organic molybdates, organic tungstates, organic formates and the like.

Prior to the step involving either a size selective divider or membrane, the contaminated solutions containing the organic hydroxide and impurities may be optionally concentrated. That is, the concentration of the organic hydroxide in the contaminated solution may be increased prior to the step involving either a size selective divider or membrane. In most embodiments, it is preferable to concentrate the contaminated solution prior to practicing the present invention. Concentration procedures are known to those skilled in the art and include evaporation, ion exchange, electrodialysis, and reverse osmosis among others.

The contaminated solution, after it has optionally been concentrated, is contacted with either a size selective divider, such as a size selective cation selective membrane, or a size selective membrane, such as a nanofiltration membrane. The size selective divider or membrane permits certain ions to pass therethrough, depending upon a number of factors including size, molecular weight, and magnitude and type of charge.

Generally speaking, the contaminated solution is subjected to one of two procedures prior to being charged into an electrochemical cell. The first procedure involves charging the contaminated solution into a first electrochemical cell containing a divider, and preferably a size selective cation selective membrane; and the second procedure involves forming an organic salt, such as an onium salt, followed by contacting the organic salt solution with a size selective membrane such as a nanofiltration membrane. Although both procedures may be practiced prior to charging the contaminated solution to an electrochemical cell, it is preferable only one of these two procedures.

In one embodiment, before contacting the contaminated solution with either a size selective divider or membrane, the contaminated solution is treated to form a solution containing an organic salt from the organic cations in the contaminated solution. Preferably, the organic salt is formed prior to contacting the contaminated solution with a size selective membrane such as a nanofiltration membrane. In a preferred embodiment, the organic salt is a high molecular weight onium salt. The organic salt may be soluble or completely or partially insoluble in solution. The solubility of the organic salt preferably varies depending upon the temperature. In embodiments where the contaminated solution is contacted with a size selective membrane, such as a nanofiltration membrane, the newly formed organic salt is much less likely to pass through the size selective membrane, thereby increasing the relative amount of impurities which pass through the size selective membrane.

In one embodiment, a salt or acid is added to the contaminated solution thereby forming a high molecular weight organic salt. The salt or acid added is preferably an inorganic salt or an inorganic acid. Examples of salts which cause the formation of an organic salt include ammonium, sodium, potassium and other metal perchlorates; ammonium, sodium, potassium and other metal hexafluoroaluminates; ammonium, sodium, potassium and other metal hexafluoroantimonates; ammonium, sodium, potassium and other metal hexafluoroarsenates; ammonium, sodium, potassium and other metal hexafluorophosphates; ammonium, sodium, potassium and other metal hexafluorosilicates; ammonium, sodium, potassium and other metal hexafluorotitanates; ammonium, sodium, potassium and other metal hexafluorozirconates; ammonium, sodium, potassium and other metal iodides and iodates; ammonium, sodium, potassium and other metal periodates; ammonium, sodium, potassium and other metal persulfates; ammonium, sodium, potassium and other metal bromides; ammonium, sodium, potassium and other metal fluorides and chlorides; ammonium, sodium, potassium and other metal picrates; ammonium, sodium, potassium and other metal sulfates; ammonium, sodium, potassium and other metal nitrates; ammonium, sodium, potassium and other metal permanganates and the like. Examples of acids which cause the formation of an organic salt include perchloric acid, hydriodic acid, fluoboric acids including tetrafluoboric acid, hexafluorophosphoric acid, sulfuric acid, nitric acid, phosphoric acid, phosphorous acid, polyphosphoric acids, hydrochloric acid, hydrobromic acid, picric acid, permanganic acid and any acid generally corresponding to the salts listed above.

In another embodiment, the organic salt is formed via ion exchange techniques using an ion exchange system. Ion exchange may take place in a column. The organic salt is at least partially constituted by a compound containing an organic cation (from the organic hydroxide) and an anion (from the salt or acid added or from ion exchange).

The organic salt is not formed by neutralization with carbon dioxide. The formation of bicarbonates and carbonate salts is not desirable since the corresponding organic carbonates and bicarbonates complicate the process and/or the electrochemical cells. Moreover, adverse effects on the present invention may occur when carbonate and bicarbonate salts are used.

The organic salts include salts constituted by the organic cation and any of the corresponding anions listed above. Specific examples include an organic chloride salt, an organic perchlorate salt, an organic iodide salt, an organic fluorine salt (an anion containing fluorine atoms) such as any of the hexafluorocompounds listed above, an organic bromine salt, an organic picric salt, an organic permanganate salt, an organic nitrate salt or any salt corresponding to any of the anions listed above. The anion of the organic salt is selected based upon a number of factors including the specific identity of the organic cation, the relative solubilities of the resultant organic salt and salts of any metal ion impurities.

In another embodiment, after optionally concentrating the contaminated solution and after forming an organic salt, the contaminated solution is contacted with a size selective membrane under pressure. In a preferred embodiment, the size selective membrane is a microfiltration membrane such as a nanofiltration membrane. The pressure applied is generally at least about 100 psi, and preferably from about 200 to about 1,000 psi, and more preferably from about 300 to about 800 psi.

In another preferred embodiment, especially after an organic salt has been formed, the concentration of the organic salt is adjusted so that it is between about 1% and about 5% by weight of solution. The size selective membrane is generally in a pressure cell or in the form of a cartridge. The contaminated solution is contacted with the size selective membrane under sufficient pressure whereby metal ion impurities pass through the size selective membrane. In typical operation, a portion of the contaminated solution, such as one quarter, one half, or three quarters, is forced through the size selective membrane leaving the organic salt in the portion which does not pass through the size selective membrane.

The portion of the solution which does not pass through the size selective membrane containing the organic salt contains a reduced amount of metal ion impurities and/or the ratio of onium ions to metal ion impurities is greater than the ratio in the solution prior to contact with the size selective membrane. The organic salt is obtained from the size selective membrane by elution or backwashing techniques. This solution containing the organic salt is then charged to an electrochemical cell to purify and/or regenerate organic hydroxide.

Examples of size selective membranes include MPF-34 nanofiltration membrane from Kinyat-Weizmann LTD., Desal-5 from LCI, Inc., and ESNA nanofiltration membrane from Hydronautics. Other nanofiltration membranes are available from Dow and FilmTec.

In another embodiment, the contaminated solution, which has been optionally concentrated, is charged to a first electrochemical cell. In this embodiment, the process of the present invention involves the use of two electrochemical cells. In this embodiment, the first electrochemical cell contains at least an anode, a cathode, and a divider. Optionally, the first electrochemical cell further contains a bipolar membrane. In a preferred embodiment, the divider is a cation selective membrane, and more preferably a size selective cation selective membrane. The contaminated solution is charged to the first electrochemical cell whereupon metal ion impurities, such as lithium, sodium, and potassium, leave the waste solution by passing through the divider as a result of passing a current through the electrochemical cell. Relevant descriptions of the electrochemical cells used in all embodiments of the present invention (discussed later) may be applicable to the first electrochemical cells of this embodiment, and for sake of brevity are not repeated in this section.

Electrochemical cells in this embodiment contain at least two compartments; namely, a feed-recovery compartment and a waste compartment, and optionally a water compartment and/or pass compartment. In certain embodiments, a first electrochemical cell according to this embodiment may have two or more of each of the compartments described above. For example, in one embodiment, a first electrochemical cell according to this embodiment may have two feed-recovery compartments, a water compartment, and two waste compartments. A solution is charged to each compartment. The solution may be aqueous based, alcohol or glycol based, or another organic solution or combinations thereof. In a preferred embodiment, the solution charged into each compartment is an aqueous solution.

The solution charged into the feed-recovery compartment contains the organic hydroxide to be recycled or purified at a certain concentration and impurities, such as metal ion impurities. The concentration of the organic hydroxide initially charged into the feed-recovery compartment is in the range from about 1% to about 20% by weight and more preferably from about 2% to about 10% by weight. The solution also contains metal ion impurities in most instances, such as lithium ions, sodium ions, potassium ions, magnesium ions, and calcium ions.

The waste compartment initially is charged with a solution and preferably an aqueous solution. The solution charged to the waste compartment may or may not contain an ionic compound. After passing a current through the first electrochemical cell, the organic hydroxide may be recovered from the feed-recovery compartment. The concentration of the organic hydroxide recovered from the feed-recovery compartment may be the same or higher than the initial concentration of the organic hydroxide in the solution initially charged to the feed-recovery compartment.

Upon application of a current, the metal ion impurities migrate through the divider, and in a preferred embodiment migrate through the size selective cation selective membrane, into the waste compartment. As a result, the solution recovered from the feed-recovery compartment contains markedly fewer metal ion impurities. Examples of the size selective cation selective membranes include CMS ion selective membrane from Tokuyama Soda and CSV ion selective membrane from Asahi Glass.

Several embodiments of the first electrochemical cell which may be used according to this embodiment will be described with reference to the figures. Although two embodiments of the first electrochemical cell are described in the figures, it will be readily apparent to those skilled in the art that additional numerous embodiments not specifically described in the figures exist within the scope of the invention.

An embodiment of a first electrochemical cell is illustrated in FIG. 1, which is a schematic representation of an electrochemical cell 10 containing an anode 11, a cathode 12 and a unit cell containing in sequence, beginning at the anode 11, a divider 13, which in a preferred embodiment is a size selective cation selective membrane. The electrochemical cell 10 contains two compartments; namely, a feed-recovery compartment 14 and a waste compartment 15.

In operation of the electrochemical cell 10 illustrated in FIG. 1, a solution containing an organic hydroxide and metal ion impurities is charged to the feed-recovery compartment 14. Water is charged to the waste compartment 15. An electrical potential is established and maintained between the anode and the cathode to produce a flow of current across the cell whereupon at least some of the metal ion impurities are attracted toward the cathode and pass through the divider 13 into the waste compartment 15. The organic hydroxide remains in the feed-recovery compartment to produce a desired solution of organic hydroxide containing a smaller amount of metal ion impurities compared to the solution initially charged therein. The new organic hydroxide solution containing fewer metal ion impurities is recovered from the feed-recovery compartment 14.

Figure 9:
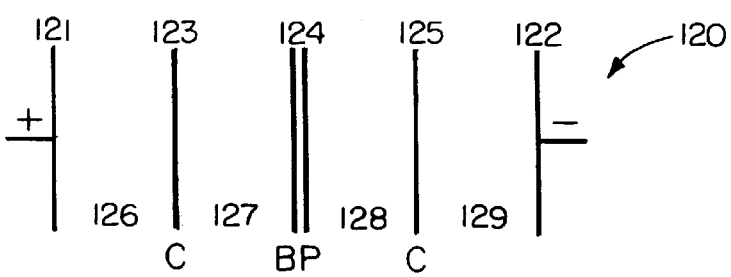
FIG. 9 is a schematic representation of another four compartment electrochemical cell in accordance with the present invention.

Another embodiment of an electrochemical cell is illustrated in FIG. 9, which is a schematic representation of an electrochemical cell 120 containing two unit cells, although more unit cells can be contained therein. The electrochemical cell 120 contains an anode 121, a cathode 122 and in sequence beginning at the anode 121, a first size selective cation selective membrane 123, a bipolar membrane 124, and a second size selective cation selective membrane 125. The bipolar membrane 124 has its anion selective side (not shown) facing the anode 121 and cation selective side (not shown) facing the cathode 122. The electrochemical cell 120 contains four compartments; namely, a first feed-recovery compartment 126, a first waste compartment 127, a second feed-recovery compartment 128, and a second waste compartment 129.

In operation of the electrochemical cell 120 illustrated in FIG. 9, a solution containing an organic hydroxide and metal ion impurities is charged to the feed-recovery compartments 126 and 128. Water is charged to the waste compartments 127 and 129. An electrical potential is established and maintained between the anode and the cathode to produce a flow of current across the cell whereupon at least some of the metal ion impurities are attracted toward the cathode and pass through either the first or second size selective cation selective membrane 123 or 125 into the respective waste compartment 127 or 129. The organic hydroxide remains in the feed-recovery compartments to produce desired solutions of organic hydroxide containing smaller amounts of metal ion impurities compared to the solution initially charged therein. The new organic hydroxide solution containing fewer metal ion impurities is recovered from the feed-recovery compartments 126 and 128.

The contaminated solution recovered from the feed-recovery compartment may than be charged to a second electrochemical cell so that the organic hydroxide may be purified and/or regenerated.

In accordance with the process of the present invention, the organic hydroxides such as those described above are purified or recycled in a process including a step involving an electrochemical cell (or in some embodiments, a second electrochemical cell). The step involving an electrochemical cell may be by electrolysis in an electrolytic cell or by electrodialysis in an electrodialytic cell. The electrochemical cells, generally speaking, contain at least an anode, a cathode, and a divider, and/or one or more unit cells assembled for operational positioning between the anode and the cathode. A number of electrolytic and electrodialytic cells containing various unit cells and multiple unit cells are described herein which are useful in the process of the present invention. Multiple unit cells may be defined by a number of compartments between an anode and a cathode (see, for example, FIG. 6), or multiple unit cells may be defined by a number of compartments including an anode and cathode (see, for example, FIG. 3). Multiple unit cells including an anode and cathode may take a monopolar configuration (see, for example, FIG. 3), or a bipolar configuration (see, for example, FIG. 7). There is no particular limit to the number of unit cells which can be used. Nevertheless, in one embodiment, electrochemical cells which are used according to the present invention contain from 1 to about 25 unit cells, and preferably from 1 to about 10 unit cells.

The unit cells may contain two or more compartments defined by the anode, cathode, and one or more dividers or separators which may be (1) nonionic microporous diffusion barriers such as screens, filters, diaphragms, etc., of controlled pore size or pore size distribution allowing or not allowing certain ions to pass through the divider or separator, or (2) ionic dividers or separators such as anion selective membranes and cation selective membranes which are preferred since their use generally results in the production of organic hydroxides of higher purity and in higher yield. The various dividers useful in the electrochemical cells used in the invention are described more fully below.

Electrochemical cells according to the present invention contain at least two compartments; namely, a feed compartment and a recovery compartment. Optionally, electrochemical cells according to the present invention may contain at least one water compartment, pass compartment and/or an inorganic salt or inorganic acid recovery compartment. In certain embodiments, an electrochemical cell according to the invention may have two or more of each of the compartments described above. In other embodiments, the electrochemical cell may have two or more of one or more of the compartments listed above. For example, in one embodiment, an electrochemical cell may have a feed compartment, two water or pass compartments and a recovery compartment.

A solution is charged to each compartment. The solution may be aqueous based, alcohol or glycol based, an organic solution or combinations thereof. In a preferred embodiment, the solution charged into each compartment is an aqueous solution. The solution charged into the feed compartment contains the organic hydroxide for recycling or purifying or an organic salt for regenerating an organic hydroxide at a certain concentration. The concentration of the organic hydroxide or the organic salt initially charged into the feed compartment is in the range from about 0.1M to about 2M. In a preferred embodiment, the concentration of the organic hydroxide or the organic salt in the solution charged into the feed compartment is from about 0.2M to about 1M. In electrochemical cells containing two or more feed compartments, the concentrations of the organic hydroxide or the organic salt in the solutions charged into the feed compartments may be the same or different for each feed compartment. The concentration of the organic hydroxide or the organic salt in the solution charged to the cell is from about 1% to about 20% by weight and more often between 2% and 10% by weight. The feed compartment, as the term implies, holds the solution containing an organic hydroxide originating from or the organic salt derived from the contaminated solution which is to be recycled and processed by the present invention.

The recovery compartment initially is charged with a solution and preferably an aqueous solution. The solution charged to the recovery compartment may or may not contain an ionic compound. After passing a current through the electrochemical cell, the organic hydroxide may be recovered or otherwise obtained from the recovery compartment at a certain concentration. After passing a current through the electrochemical cell, the concentration of the organic hydroxide in the recovery compartment is generally higher than the concentration of the organic hydroxide or the organic salt in the solution initially charged into the feed compartment. In one embodiment, the concentration of the organic hydroxide in the recovery compartment is above about 0.1M. In another embodiment, the concentration of the organic hydroxide in the recovery compartment is above about 0.2M. In a preferred embodiment, the concentration of the organic hydroxide in the recovery compartment is above about 1M. In electrochemical cells containing two or more recovery compartments, the concentrations of the organic hydroxide in the solutions recovered from the recovery compartments may be the same or different for each recovery compartment.

The water compartment, if present, contains a solution of an ionic compound at a certain concentration. The water compartment containing an ionic compound serves to maintain conductivity and enable lower operating cell voltages. An ionic compound is a chemical compound that ionizes in solution, such as an electrolyte. Examples of ionic compounds include salts, metal salts and acids or any compound which forms an anion and cation when dissolved in water. In a preferred embodiment, the ionic compound is the same as the organic hydroxide or the organic salt charged into the feed compartment. In another preferred embodiment, either the anion or cation of the ionic compound is the same as either the organic cation or hydroxide anion or salt anion of the organic hydroxide or the organic salt charged into the feed compartment. In another embodiment, the ionic compound is different from the organic hydroxide or the organic salt charged into the feed compartment. The concentration of the ionic compound in the solution charged into the water compartment is in the range from about 0.1M to about 5M. In a preferred embodiment, the concentration is from about 0.3M to about 3M. And in a most preferred embodiment, the concentration is from about 0.5M to about 2M. In electrochemical cells containing two or more water compartments, the concentrations of the ionic compound in the solutions charged into the water compartments may be the same or different for each water compartment.

The pass compartment, if present, initially is charged with a solution and preferably an aqueous solution. The solution charged to the pass compartment may or may not contain an ionic compound. The ionic compound, if present, may be the same or different from the ionic compound of the water compartment. After passing a current through the electrochemical cell, the organic hydroxide passes through the pass compartment in embodiments where a pass compartment is used. Since most undesirable impurities do not pass through the pass compartment, the pass compartment serves to further purify the organic hydroxide.

The inorganic salt or inorganic acid recovery compartment, if present, initially is charged with a solution and preferably an aqueous solution. The solution charged to the inorganic salt or inorganic acid recovery compartment may or may not contain an ionic compound. The ionic compound, if present, may be the same or different from the ionic compound of the water compartment. After passing a current through the electrochemical cell, the organic cation migrates to the cathode while anions from the organic salt, if present, pass from the feed compartment to the inorganic salt or inorganic acid recovery compartment in embodiments where an inorganic salt or inorganic acid recovery compartment is used. The inorganic salt or inorganic acid may be recovered and used, especially in a continuous operation, as the salt or acid added to the contaminated solution to form the organic salt.

Several embodiments of electrochemical cells which may be used in the present invention will be described with reference to the figures. Although numerous embodiments of various electrochemical cells are described in the figures, it will be readily apparent to those skilled in the art that additional numerous embodiments not specifically described in the figures exist within the scope of the invention.

An embodiment of an electrochemical cell is illustrated in FIG. 1, which is a schematic representation of an electrochemical cell 10 containing an anode 11, a cathode 12 and a unit cell containing in sequence, beginning at the anode 11, a divider 13, which in a preferred embodiment is a cation selective membrane. The electrochemical cell 10 contains two compartments; namely, a feed compartment 14 and a recovery compartment 15.

In operation of the electrochemical cell 10 illustrated in FIG. 1, a solution containing an organic salt or organic hydroxide is charged to the feed compartment 14. Water is charged to the recovery compartment 15. An electrical potential is established and maintained between the anode and the cathode to produce a flow of current across the cell whereupon the organic cation is attracted toward the cathode and passes through the divider 13 into the recovery compartment 15. The organic cation combines with hydroxide ions in the recovery compartment to produce the desired organic hydroxide. Impurities are not attracted to the cathode or do not pass through the divider and thus remain in the feed compartment. Purified organic hydroxide is formed and recovered from the recovery compartment 15.

Another embodiment of an electrochemical cell is illustrated in FIG. 2, which is a schematic representation of an electrochemical cell 20 containing an anode 21, a cathode 22 and a unit cell containing in sequence, beginning at the anode 21, an anion selective membrane 23 and a cation selective membrane 24. The electrochemical cell 20 contains three compartments; namely, an inorganic salt or inorganic acid recovery compartment 25, a feed compartment 26 and a recovery compartment 27.

In operation of the electrochemical cell 20 illustrated in FIG. 2, a solution containing an organic salt or organic hydroxide is charged to the feed compartment 26. Water is charged to the inorganic salt or inorganic acid recovery compartment 25 and the recovery compartment 27. An electrical potential is established and maintained between the anode and the cathode to produce a flow of current across the cell whereupon the organic cation of the organic salt or organic hydroxide is attracted toward the cathode and passes through the cation selective membrane 24 into the recovery compartment 27. The organic cation combines with hydroxide ions in the recovery compartment to produce the desired organic hydroxide. Impurities are attracted to the anode, and/or they not attracted to the cathode and/or they do not pass through the cation selective membrane 24 and/or remain in the feed compartment. Purified organic hydroxide is formed and recovered from the recovery compartment 27. At the same time, the anion of the organic salt, if present, is attracted to the anode thereby passing through the anion selective membrane 23 into the inorganic salt or inorganic acid recovery compartment 25. The anion combines with cations to produce an acid or salt in the inorganic salt or inorganic acid recovery compartment 25. The acid or salt is then recovered from the inorganic salt or inorganic acid recovery compartment 25 so that it may be reused to form additional organic salt when a continuous process is utilized.

Figure 3:
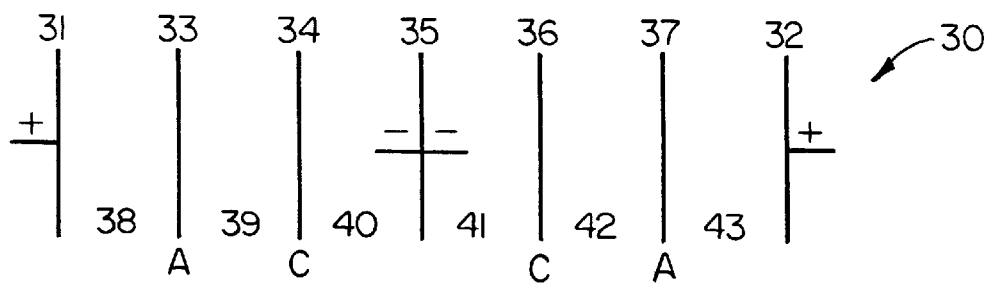
FIG. 3 is a schematic representation of an electrochemical cell containing a stack of two units of the unit cell of FIG. 2 in a monopolar configuration.

In another embodiment, an electrochemical cell similar to that of FIG. 2, except that a polyunit cell of two unit cells utilized in a monopolar configuration, is illustrated in FIG. 3, which is a schematic representation of an electrochemical cell 30 containing a first anode 31, a second anode 32, a cathode 35 and two unit cells containing in sequence, beginning at the first cathode 31, a first anion selective membrane 33, a first cation selective membrane 34, the cathode 35, a second cation selective membrane 36, and a second anion selective membrane 37. The electrochemical cell 30 illustrated in FIG. 3 contains six compartments; namely, a first inorganic salt or inorganic acid recovery compartment 38, a first feed compartment 39, a first recovery compartment 40, a second recovery compartment 41, a second feed compartment 42 and a second inorganic salt or inorganic acid recovery compartment 43.

In operation of the electrochemical cell illustrated in FIG. 3, an aqueous solution is charged to the inorganic salt or inorganic acid recovery and recovery compartments. A solution containing an organic salt or organic hydroxide is charged to feed compartments. An electrical potential is established and maintained between the anodes and the cathode to produce a flow of current across the cell whereupon the organic cation of the organic salt or organic hydroxide is attracted to the cathode thereby passing through either the first or the second cation selective membranes 34 and 36 into the recovery compartments 40 and 41. At the same time, the anion of the organic salt, if present, is attracted to the respective anodes thereby passing through either the first or the second anion selective membranes 33 and 37 into the inorganic salt or inorganic acid recovery compartments 38 and 43. The organic cation combines with hydroxide ions to produce the desired organic hydroxide in the recovery compartments 40 and 41. The organic hydroxide is then recovered from the recovery compartments 40 and 41. The anion combines with cations to produce an acid or salt in the inorganic salt or inorganic acid recovery compartments 38 and 43. The acid or salt is then recovered from the inorganic salt or inorganic acid recovery compartments 38 and 43 so that it may be reused to form additional organic salt when a continuous process is utilized.

Figure 4:
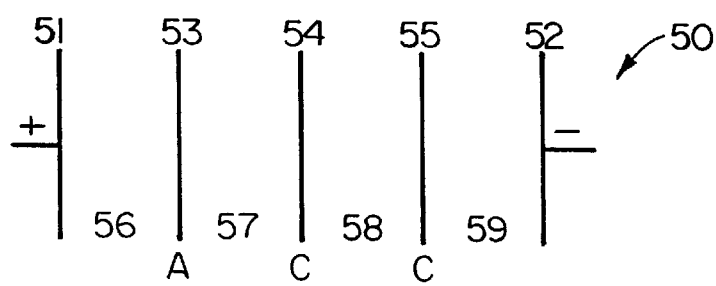
FIG. 4 is a schematic representation of a four compartment electrochemical cell in accordance with the present invention.

Another embodiment of an electrochemical cell is illustrated in FIG. 4, which is a schematic representation of an electrochemical cell 50 containing an anode 51, a cathode 52 and a unit cell containing in sequence, beginning at the anode 51, an anion selective membrane 53, a first cation selective membrane 54 and a second cation selective membrane 55. The electrochemical cell 50 contains four compartments; namely, an inorganic salt or inorganic acid recovery compartment 56, a feed compartment 57, a pass compartment 58 and a recovery compartment 59.

In operation of the electrochemical cell 50 illustrated in FIG. 4, a solution containing an organic salt or organic hydroxide is charged to the feed compartment 57. Water is charged to the inorganic salt or inorganic acid recovery compartment 56, the pass compartment 58 and the recovery compartment 59. An electrical potential is established and maintained between the anode and the cathode to produce a flow of current across the cell whereupon the organic cation of the organic salt or organic hydroxide is attracted toward the cathode and passes through the first and second cation selective membranes 54 and 55 and pass compartment 58 into the recovery compartment 59. The organic cation combines with hydroxide ions in the recovery compartment to produce the desired organic hydroxide. Impurities are attracted to the anode, and/or they are not attracted to the cathode and/or they do not pass through the first and second cation selective membranes 54 and 55 and/or remain in the feed compartment. Regenerated organic hydroxide is formed and recovered from the recovery compartment 59. At the same time, the anion of the organic salt, if present, is attracted to the anode thereby passing through the anion selective membrane 53 into the inorganic salt or inorganic acid recovery compartment 56. The anion combines with cations to produce an acid or salt in the inorganic salt or inorganic acid recovery compartment 56. The acid or salt is then recovered from the inorganic salt or inorganic acid recovery compartment 56 so that it may be reused to form additional organic salt when a continuous process is utilized.

Figure 5:
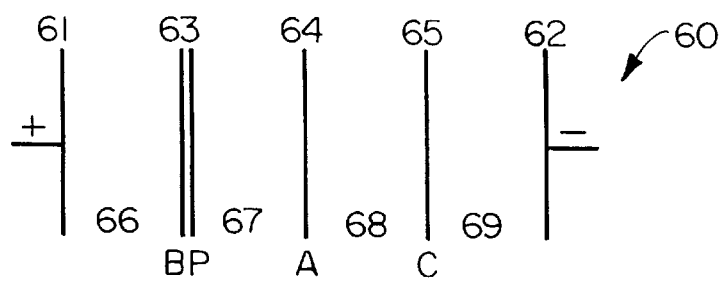
FIG. 5 is a schematic representation of another four compartment electrochemical cell in accordance with the present invention.

Another embodiment of an electrochemical cell is illustrated in FIG. 5, which is a schematic representation of an electrochemical cell 60 containing an anode 61, a cathode 62 and a unit cell containing in sequence, beginning at the anode 61, a bipolar membrane 63, an anion selective membrane 64, and a cation selective membrane 65. The bipolar membrane 63 has an anion selective side (not shown) facing the anode 61 and a cation selective side (not shown) facing the cathode 62. The electrochemical cell 60 contains four compartments; namely, a water compartment 66, an inorganic salt or inorganic acid recovery compartment 67, a feed compartment 68, and a recovery compartment 69.

In operation of the electrochemical cell 60 illustrated in FIG. 5, a solution containing an organic salt or organic hydroxide is charged to the feed compartment 68. Water is charged to the inorganic salt or inorganic acid recovery compartment 67 and the recovery compartment 69. Water and an ionic compound is charged to the water compartment 66. An electrical potential is established and maintained between the anode and the cathode to produce a flow of current across the cell whereupon the organic cation of the organic salt or organic hydroxide is attracted toward the cathode and passes through the cation selective membrane 65 into the recovery compartment 69. The organic cation combines with hydroxide ions in the recovery compartment to produce the desired organic hydroxide. Impurities are attracted to the anode, and/or they are not attracted to the cathode and/or they do not pass through the cation selective membrane 65 and/or remain in the feed compartment. Purified organic hydroxide is formed and recovered from the recovery compartment 69. At the same time, the anion of the organic salt, if present, is attracted to the anode thereby passing through the anion selective membrane 64 into the inorganic salt or inorganic acid recovery compartment 67. The anion combines with cations to produce an acid or salt in the inorganic salt or inorganic acid recovery compartment 67. The acid or salt is then recovered from the inorganic salt or inorganic acid recovery compartment 67 so that it may be reused to form additional organic salt when a continuous process is utilized.

Figure 6:
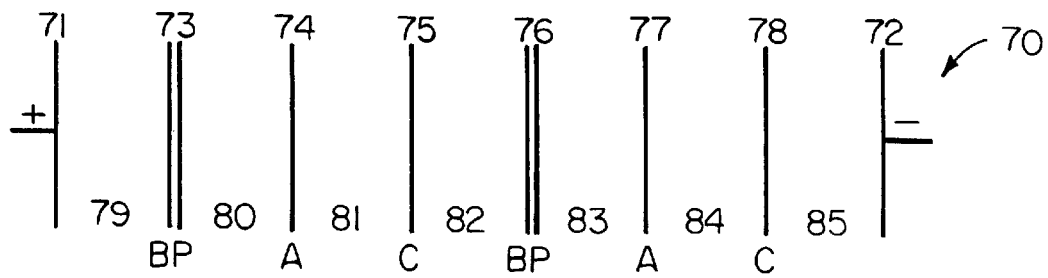
FIG. 6 is a schematic representation of an electrochemical cell containing two unit cells of FIG. 5 in accordance with the present invention.

Another embodiment of an electrochemical cell is illustrated in FIG. 6, which is a schematic representation of an electrochemical cell 70 containing two unit cells similar to the cell of FIG. 5. The electrochemical cell 70 contains an anode 71, a cathode 72 and in sequence, beginning at the anode 71, a first bipolar membrane 73, a first anion selective membrane 74, a first cation selective membrane 75, a second bipolar membrane 76, a second anion selective membrane 77, and a second cation selective membrane 78. The bipolar membranes 73 and 76 have their anion selective sides (not shown) facing the anode 71 and cation selective sides (not shown) facing the cathode 72. The electrochemical cell 70 contains seven compartments; namely, a water compartment 79, a first inorganic salt or inorganic acid recovery compartment 80, a first feed compartment 81, a first recovery compartment 82, a second inorganic salt or inorganic acid recovery compartment 83, a second feed compartment 84, and a second recovery compartment 85.

In operation of the electrochemical cell 70 illustrated in FIG. 6, a solution containing an organic salt or organic hydroxide is charged to the feed compartments 81 and 84. Water is charged to the inorganic salt or inorganic acid recovery compartments and the recovery compartments. Water and an ionic compound is charged to the water compartment 79. An electrical potential is established and maintained between the anode and the cathode to produce a flow of current across the cell whereupon the organic cation of the organic salt or organic hydroxide is attracted toward the cathode and passes through either the first or second cation selective membrane 75 or 78 into the respective recovery compartment 82 or 85. The organic cation combines with hydroxide ions in the recovery compartment to produce the desired organic hydroxide. Impurities are attracted to the anode, and/or they are not attracted to the cathode and/or they do not pass through the cation selective membranes and/or remain in the feed compartments. Purified organic hydroxide is formed and recovered from the recovery compartments 82 and 85. At the same time, the anion of the organic salt, if present, is attracted to the anode thereby passing through either the first or second anion selective membrane 74 or 77 into the respective inorganic salt or inorganic acid recovery compartment 80 or 83. The anion combines with cations to produce an acid or salt in the inorganic salt or inorganic acid recovery compartments. The acid or salt is then recovered from the inorganic salt or inorganic acid recovery compartments 80 and 83 so that it may be reused to form additional organic salt when a continuous process is utilized.

Figure 7:
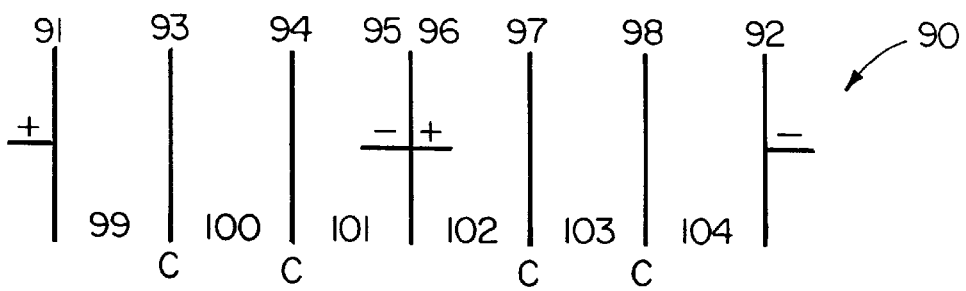
FIG. 7 is a schematic representation of an electrochemical cell containing a stack of two unit cells in a bipolar configuration.

In another embodiment, an electrochemical cell containing a polyunit cell of two unit cells in a bipolar configuration, is illustrated in FIG. 7, which is a schematic representation of an electrochemical cell 90 containing a first anode 91, a first cathode 92 and in sequence, beginning at the first cathode 91, a first cation selective membrane 93, a second cation selective membrane 94, a second cathode 95, a second anode 96, a third cation selective membrane 97, and a forth cation selective membrane 98. The electrochemical cell 90 illustrated in FIG. 7 contains six compartments; namely, a first feed compartment 99, a first pass compartment 100, a first recovery compartment 101, a second feed compartment 102, a second pass compartment 103 and a second recovery compartment 104.

In operation of the electrochemical cell illustrated in FIG. 7, an aqueous solution is charged to the pass and recovery compartments. A solution containing an organic salt or organic hydroxide is charged to feed compartments. An electrical potential is established and maintained between the anodes and the cathodes to produce a flow of current across the cell where upon the organic cation of the organic salt or organic hydroxide is attracted to the cathodes thereby passing through either the first or the second cation selective membranes 94 and 98 into the respective recovery compartments 101 and 104. The organic cation combines with hydroxide ions to produce the desired organic hydroxide in the recovery compartments 101 and 104. The organic hydroxide is then recovered from the recovery compartments 101 and 104.

Figure 8:
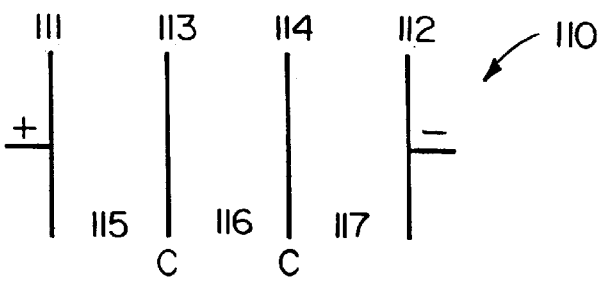
FIG. 8 is a schematic representation of another three compartment electrochemical cell in accordance with the invention.

Another embodiment of an electrochemical cell is illustrated in FIG. 8, which is a schematic representation of an electrochemical cell 110 containing an anode 111, a cathode 112 and a unit cell containing in sequence, beginning at the anode 111, a first cation selective membrane 113 and a second cation selective membrane 114. The electrochemical cell 110 contains three compartments; namely, a feed compartment 115, a pass compartment 116 and a recovery compartment 117.

In operation of the electrochemical cell 110 illustrated in FIG. 8, a solution containing an organic salt or organic hydroxide is charged to the feed compartment 115. Water is charged to the pass compartment 116 and the recovery compartment 117. An electrical potential is established and maintained between the anode and the cathode to produce a flow of current across the cell whereupon the organic cation of the organic salt or organic hydroxide is attracted toward the cathode and passes through the cation selective membranes into the recovery compartment 117. The organic cation combines with hydroxide ions in the recovery compartment to produce the desired organic hydroxide. Impurities are attracted to the anode, and/or they are not attracted to the cathode and/or they do not pass through the cation selective membranes and/or remain in the feed compartment. Purified organic hydroxide is formed and recovered from the recovery compartment 117.

Since the desired product is the organic hydroxide, the recovery compartment contains a solution of water, alcohol, another organic liquid or a mixture of water and alcohol and/or an organic solvent provided that the recovery compartment contains sufficient water so that the desired organic hydroxide may form or be purified. The term regenerate is used to indicate that random organic cations and random hydroxide anions form organic hydroxides in solution.

Operation of the process of the present invention may be continuous or batchwise. Operation of the process of the present invention generally is continuous and certain components are continuously recirculated. Circulation is effected by pumping and/or by gas evolution.

Various materials can be used as anodes in the electrochemical cells. For example, the anode may be made of metals such as titanium-coated electrodes, tantalum, zirconium, hafnium or alloys of the same. Generally, the anodes will have a non-passivable and catalytic film which may comprise metallic noble metals such as platinum, iridium, rhodium or alloys thereof, or a mixture of electroconductive oxides containing at least one oxide or mixed oxides of a noble metal such as platinum, iridium, ruthenium, palladium or rhodium. In one embodiment, the anode is a dimensionally stable anode such as an anode having a titanium base with ruthenium and/or iridium oxides thereon. In a preferred embodiment, the anode is a dimensionally stable anode having a titanium base with ruthenium oxide thereon.

Various materials which have been used as cathodes in electrochemical cells can be included in the cells used in the above and other embodiments of the present invention. Cathode materials include nickel, iron, stainless steel, nickel plated titanium, graphite, carbon steel (iron) or alloys thereof etc. The term "alloy" is used in a broad sense and includes intimate mixtures of two or more metals as well as one metal coated onto another metal.

The electrochemical cell utilized in the process of the present invention contains at least one divider, such as an ionic selective membrane, and optionally at least one bipolar membrane. Compartments are defined as the area between two of: dividers and/or bipolar membranes and/or the anode (s) and/or the cathode(s). The dividers and/or bipolar membranes function as diffusion barriers and/or gas separators.

The dividers which can be utilized in the present invention can be selected from a wide variety of microporous diffusion barriers, screens, filters, diaphragms, membranes, etc., which contain pores of the desired size to allow cations of the organic salt or organic hydroxide, such as onium cations, to migrate toward the cathode. The microporous dividers can be prepared from various materials including plastics such as polyethylene, polypropylene and Teflon® (polytetrafluoroethylene), ceramics, etc. Microporous dividers such as nonionic dividers can be used, for example, in addition to the dividers listed in the Figures. Specific examples of commercially available microporous separators include: Celanese Ceigard and Norton Zitex. Microporous separators are particularly useful when the process of the present invention is utilized to purify the organic hydroxides such as tetra n-butyl phosphonium hydroxide and tetra n-butyl ammonium hydroxide.

The cation selective membranes used in the cells and the process of the invention may be any of those which have been used in the electrochemical purification or recycling of organic hydroxides. Preferably, the cation-exchange membranes should contain a highly durable material such as the membranes based on the fluorocarbon series, or from less expensive materials of the polystyrene or polypropylene series. Preferably, however, the cation selective membranes useful in the present invention include fluorinated membranes containing cation selective groups such as perfluorosulfonic acid and perfluorosulfonic and/ perfluorocarboxylic acid, perfluorocarbon polymer membranes such as sold by the E. I. dupont Nemours & Co. under the general trade designation "Nafion®" such as DuPont's Cationic Nafion® 902 membrane. Other suitable cation selective membranes include styrenedivinyl benzene copolymer membranes containing cation selective groups such as sulfonate groups, carboxylate groups, etc. Raipore Cationic R1010, (from Pail RAI), and NEOSEPTA CMH and NEOSEPTA CM1 membranes from Tokuyama Soda are useful particularly with the higher molecular quaternary compounds. The preparation and structure of cation selective membranes are described in the chapter entitled "Membrane Technology" in *Encyclopedia of Chemical Technology*, Kirk-Othmer, Third Ed., Vol. 15, pp. 92–131, Wiley & Sons, New York, 1985. These pages are hereby incorporated by reference for their disclosure of various cation selective membranes which can be useful in the process of the present invention. The use of at least one cation selective membrane in the electrochemical cell is preferred.

Any anion selective membrane may be utilized including membranes used in processes for the desalination of brackish water. Preferably, membranes should be selective with respect to the particular anions present in the cell (e.g., halide ions). The preparation and structure of anionic membranes are described in the chapter entitled "Membrane Technology" in *Encyclopedia of Chemical Technology*, Kirk-Othmer, Third Ed., Vol. 15, pp. 92–131, Wiley & Sons, New York, 1985. These pages are hereby incorporated by reference for their disclosure of various anionic membranes which may be useful in the process of the present invention.

Among the anion selective membranes which may be utilized in the electrochemical cell and which are commercially available are the following: AMFLON, Series 310, based on fluorinated polymer substituted with quaternary ammonium groups produced by American Machine and Foundry Company; IONAC MA 3148, MA 3236 and MA 3475, based on polymer substituted with quaternary ammonium derived from heterogenous polyvinylchloride produced by Ritter-Pfaulder Corp., Permutit Division; Tosflex IE-SF 34 or IE-SA 48 made by Tosoh Corp. which is a membrane designed to be stable in alkaline media; NEOSEPTA AMH, NEOSEPTA ACM, NEOSEPTA AFN or NEOSEPTA ACLE-SP from Tokuyama Soda Co.; and Selemion AMV and Selemion AAV from Asahi Glass. In one embodiment, the Tosflex IE-SF 34 and NEOSEPTA AMH anion exchange membranes are preferred because of their stability in alkaline solutions, such as the hydroxide containing solutions which are involved in the process of the invention.

The bipolar membranes used in the electrochemical cells are composite membranes containing three parts: a cation selective side or region, an anion selective side or region, and an interface between the two regions. When a direct current passes across a bipolar membrane, with the cation selective side toward or facing the cathode, electrical conduction is achieved by the transport of $H^+$ and $OH^-$ ions which are produced by the dissociation of water which occurs at the interface under the influence of an electrical field. Bipolar membranes are described, for example, in U.S. Pat. Nos. 2,829,095, 4,024,043 (single film bipolar membranes) and in 4,116,889 (cast bipolar membranes). The bipolar membranes useful in the process of the present invention include NEOSEPTA BIPOLAR 1 by Tokuyama Soda, WSI BIPOLAR, and Aqualytics Bipolar membranes.

The steps involving an electrochemical cell is conducted by applying a current (generally direct current) between the anode and the cathode. The current which is passed through the electrochemical cells generally is a direct current dictated by the design and performance characteristics of the cell, which are readily apparent to those skilled in the art and/or can be determined by routine experimentation. Current densities between about 0.1 and about 50 amps per square inch may be used, and current densities between about 1 and about 10 amps per square inch are preferred. Higher or lower current densities can be used for certain specific applications. The current density is applied to the cell for a period of time which is sufficient to result in the purification or formation of the desired amount or concentration of the organic hydroxide in the feed-recovery or recovery compartment.

During the steps involving an electrochemical cell, it is generally desirable that the temperature of the liquids within the cell be maintained within the range of from about 5° C. to about 75° C., preferably from about 25° C. to about 45° C., and particularly the temperature is maintained at about 35° C. Also during the steps involving an electrochemical cell, it is generally desirable that the pH of the liquids within the cell is either alkaline or acidic. In one embodiment, the pH of the feed compartment is from about 1 to about 13, and preferably from about 4 to about 10, the pH of the water and waste compartments is from about 0 to about 14, the pH of the feed-recovery and recovery compartments is from about 12 to about 14, the pH of the pass compartment is from about 12 to about 14, and the pH of the inorganic acid or salt recovery compartment is from about 0 to about 4. Since the claimed process is a purification process involving hydroxide ions and/or acid ions, the pH changes as the process is practiced, and in particular, the pH generally increases as the process is practiced.

Although not wishing to be bound by any theory, operation of the electrochemical cells according to the invention is believed to be based, in part, on the migration of metal ion impurities from the feed-recovery compartment to the waste compartment and/or on the migration of the cation of the organic hydroxide from the feed compartment to the recovery compartment as a result of the current applied. The following examples illustrate the processes of the present invention. Unless otherwise indicated in the following examples and elsewhere in the specification and claims, all parts and percentages are by weight, all temperatures are in degrees Centigrade, and pressure is at or near atmospheric pressure.

EXAMPLE 1

A 1M tetramethylammonium aqueous solution (mixed hydroxide and chloride) containing 6.3 ppm sodium and 0.93 ppm potassium is charged to the feed-recovery compartment of an electrochemical cell according to FIG. 1. The anode is made of titanium coated with ruthenium oxide and the cathode is made of nickel. A 0.1M HCl solution is charged to the waste compartment. A current of 11 mA is applied for 11 hours. The solution recovered from the feed-recovery compartment contained 0.96M tetramethylammonium hydroxide and chloride, 3.2 ppm sodium and 0.34 ppm potassium. This solution is charged to the feed compartment of an electrochemical cell according to FIG. 8. The anode is made of titanium coated with ruthenium oxide and the cathode is made of nickel. Water is charged into the recovery and pass compartments. An electrical potential is applied thereby causing tetramethylammonium cations to migrate towards the cathode thereby producing tetramethylammonium hydroxide having reduced metallic and organic impurities in the recovery compartment. The concentration of tetramethylammonium hydroxide in the recovery compartment is above 1.2M. The recovery compartment also contains less than 3 ppm sodium and less than 0.3 ppm potassium and substantially no organic materials other than TMAH.

EXAMPLE 2

Hydrochloric acid is added to a spent waste solution of quaternary ammonium hydroxide thereby forming a quaternary ammonium chloride solution. The solution contains 1.05% quaternary ammonium chloride and 0.91 ppm sodium. A pressure cell is fitted with a MPF-34 nanofiltration membrane. Half of the quaternary ammonium chloride solution forced through the membrane under pressure of 450 psig. The portion of the solution which does not pass through the membrane contains 1.7% quaternary ammonium chloride and 0.92 ppm sodium. This solution is charged to the feed compartment of an electrochemical cell according to FIG. 2. The anode is made of titanium coated with ruthenium oxide and the cathode is made of nickel. Water is charged into the recovery and inorganic acid or inorganic salt compartments. An electrical potential is applied thereby causing tetramethylammonium cations to migrate towards the cathode thereby regenerating tetramethylammonium hydroxide having reduced metallic and organic impurities in the recovery compartment. The concentration of tetramethylammonium hydroxide in the recovery compartment is above 1.2M. The recovery compartment also contains less than 0.5 ppm sodium and substantially no organic materials other than TMAH.

EXAMPLE 3

Hydrochloric acid is added to a spent waste solution of quaternary ammonium hydroxide thereby forming a quaternary ammonium chloride solution. The solution contains 4.77% quaternary ammonium chloride and 1.77 ppm sodium. A pressure cell is fitted with a Desal-5 nanofiltration membrane. Half of the quaternary ammonium chloride solution is forced through the membrane under a pressure of 450 psig. The portion of the solution which does not pass through the membrane contains 6.35% quaternary ammonium chloride and 1.77 ppm sodium. This solution is charged to the feed compartment of an electrochemical cell according to FIG. 2. The anode is made of titanium coated with ruthenium oxide and the cathode is made of nickel. Water is charged into the recovery and inorganic acid or inorganic salt compartments. An electrical potential is applied thereby causing tetramethylammonium cations to migrate towards the cathode thereby producing tetramethylammonium hydroxide having reduced metallic and organic impurities in the recovery compartment. The concentration of tetramethylammonium hydroxide in the recovery compartment is above 1.8M. The recovery compartment also contains less than 1 ppm sodium and substantially no organic materials other than TMAH.

EXAMPLE 4

Sodium bicarbonate is added to a spent waste solution of quaternary ammonium hydroxide thereby forming a quaternary ammonium bicarbonate solution. The solution contains 0.095% quaternary ammonium bicarbonate and 0.91 ppm sodium. A pressure cell is fitted with a MPF-34 nanofiltration membrane. Half of the quaternary ammonium bicarbonate solution is forced through the membrane under a pressure of 450 psig. The portion of the solution which does not pass through the membrane contains 0.149% quaternary ammonium bicarbonate and 1.75 ppm sodium. This solution is charged to the feed compartment of an electrochemical cell according to FIG. 5. The anode is made of titanium coated with ruthenium oxide and the cathode is made of nickel. Water is charged into the recovery and inorganic acid or inorganic salt compartments. A solution of TMAH is charged to the water compartment. An electrical potential is applied thereby causing tetramethylammonium cations to migrate towards the cathode thereby producing tetramethylammonium hydroxide having reduced metallic and organic impurities in the recovery compartment. The concentration of tetramethylammonium hydroxide in the recovery compartment is above 1M. The recovery compartment also contains less than 0.5 ppm sodium and substantially no organic materials other than TMAH.

EXAMPLE 5

Sodium bicarbonate is added to a spent waste solution of quaternary ammonium hydroxide thereby forming a quaternary ammonium bicarbonate solution. The solution contains 4.01% quaternary ammonium bicarbonate and 0.69 ppm sodium. A pressure cell is fitted with a Desal-5 nanofiltration membrane. Half of the quaternary ammonium bicarbonate solution is forced through the membrane under a pressure of 450 psig. The portion of the solution which does not pass through the membrane contains 5.83% quaternary ammonium bicarbonate and 1.28 ppm sodium. This solution is charged to the feed compartment of an electrochemical cell according to FIG. 4. The anode is made of titanium coated with ruthenium oxide and the cathode is made of nickel. Water is charged into the recovery, pass and inorganic acid or inorganic salt compartments. An electrical potential is applied thereby causing tetramethylammonium cations to migrate towards the cathode thereby producing tetramethylammonium hydroxide having reduced metallic and organic impurities in the recovery compartment. The concentration of tetramethylammonium hydroxide in the recovery compartment is above 1.5M. The recovery compartment also contains less than 1.1 ppm sodium and substantially no organic materials other than TMAH.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for recovering organic hydroxide from contaminated solutions containing the organic hydroxide and impurities including metal ion impurities comprising:
   (A) charging the contaminated solution to a first electrochemical cell comprising at least two compartments, a cathode, an anode and a size selective divider and passing a current through the first electrochemical cell whereby metal ion impurities migrate through the size selective divider and organic hydroxide does not migrate through the size selective divider;
   (B) recovering a second solution containing organic hydroxide from the first electrochemical cell and charging the second solution to a second electrochemical cell comprising at least two compartments, a cathode, an anode and a divider and passing a current through the second electrochemical cell whereby the organic hydroxide is purified; and
   (C) recovering the organic hydroxide from the second electrochemical cell.

2. The process of claim 1 further comprising increasing the concentration of the organic hydroxide in the contaminated solution prior to step (A).

3. The process of claim 2, wherein the organic hydroxide concentration increasing step comprises at least one of evaporating, electrodialysis or reverse osmosis.

4. The process of claim 1, wherein the organic hydroxide is a quaternary ammonium hydroxide, a quaternary phosphonium hydroxide or a tertiary sulfonium hydroxide.

5. The process of claim 1, wherein the size selective divider of the first electrochemical cell is a cation selective membrane.

6. The process of claim 1, wherein the first electrochemical cell comprises at least three compartments, a cathode, an anode, and in order from the anode to the cathode, a bipolar membrane and a size selective cation selective membrane, the contaminated solution is charged in step (A) to a compartment formed by the bipolar membrane and the size selective cation selective membrane, and the second solution is recovered in step (B) from the compartment formed by the bipolar membrane and the size selective cation selective membrane.

7. The process of claim 1, wherein the second electrochemical cell comprises at least three compartments, a cathode, an anode, and in order from the anode to the cathode, a first cation selective membrane and a second cation selective membrane, the second solution is charged in step (B) to a compartment formed by the anode and the first cation selective membrane, and the organic hydroxide is recovered in step (C) from a compartment formed by the second cation selective membrane and the cathode.

8. The process of claim 1, wherein the organic hydroxide in the contaminated solution is a quaternary ammonium hydroxide represented by the formula

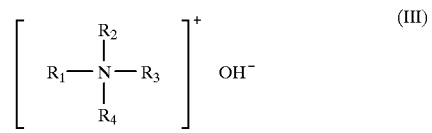

wherein $R_1$, $R_2$, $R_3$ and $R_4$ are each independently alkyl groups containing from 1 to about 10 carbon atoms, aryl groups, or $R_1$ and $R_2$ are alkaline groups which together with the nitrogen atom may form an aromatic or non-aromatic heterocyclic ring provided that if the heterocyclic group contains a —C=N-, $R_3$ is the second bond.

9. A process for recovering onium hydroxide from contaminated solutions containing the onium hydroxide and impurities including metal ion impurities comprising:
   (A) charging the contaminated solution to a first electrochemical cell comprising at least two compartments, a cathode, an anode and a size selective cation selective membrane and passing a current through the first electrochemical cell whereby metal ion impurities migrate through the size selective cation selective membrane and onium hydroxide does not migrate through the size selective cation selective membrane;
   (B) recovering a second solution containing onium hydroxide from the first electrochemical cell and charging the second solution to a second electrochemical cell comprising at least two compartments, a cathode, an anode and a divider and passing a current through the second electrochemical cell whereby the onium hydroxide is purified; and
   (C) recovering the onium hydroxide from the second electrochemical cell.

10. The process of claim 9, wherein the concentration of the onium hydroxide in the contaminated solution is increased prior to step (A).

11. The process of claim 10, wherein the onium hydroxide concentration increasing step comprises at least one of evaporating, electrodialysis or reverse osmosis.

12. The process of claim 9, wherein the onium hydroxide is a quaternary ammonium hydroxide, a quaternary phosphonium hydroxide or a tertiary sulfonium hydroxide.

13. The process of claim 9, wherein the second electrochemical cell comprises at least three compartments, a cathode, an anode, and in order from the anode to the cathode, a first cation selective membrane and a second cation selective membrane, the second solution is charged in step (B) to a compartment formed by the anode and the first cation selective membrane, and the onium hydroxide is recovered in step (C) from a compartment formed by the second cation selective membrane and the cathode.

14. A process for recovering onium hydroxide from contaminated solutions containing the onium hydroxide and impurities comprising:

(A) forming a first solution containing an onium salt and impurities from the contaminated solution;

(B) contacting the first solution with a size selective membrane under pressure, wherein at least a portion of the impurities pass through the size selective membrane thereby providing a second solution containing an onium salt and a decreased amount of impurities;

(C) charging the second solution to an electrochemical cell comprising at least two compartments, a cathode, an anode and a divider and passing a current through the cell whereby the onium hydroxide is purified; and (D) recovering the onium hydroxide from the cell.

15. The process of claim 14 wherein step (A) comprises neutralizing the contaminated solution with an inorganic acid or an inorganic salt.

16. The process of claim 14 wherein step (A) comprises passing the contaminated solution through an ion exchange system.

17. The process of claim 14 wherein the size selective membrane in step (B) is a nanofiltration membrane.

18. The process of claim 14 wherein second solution comprises from about 0.1% to about 20% by weight of an onium salt.

19. The process of claim 14 wherein second solution comprises from about 1% to about 5% by weight of an onium salt.

20. The process of claim 14 wherein the electrochemical cell comprises at least three compartments, a cathode, an anode, and in order from the anode to the cathode, an anion selective membrane and a cation selective membrane, the second solution is charged in step (C) to a compartment formed by the anion selective membrane and the cation selective membrane, and the onium hydroxide is recovered in step (D) from a compartment formed by the cation selective membrane and the cathode.

21. The process of claim 20 wherein an inorganic salt or an inorganic acid is recovered from a compartment formed by the anion selective membrane and the anode.

22. The process of claim 21 wherein the process is continuous and the inorganic salt or the inorganic acid recovered from the compartment formed by the anion selective membrane and the anode is used in step (A) to form the first solution.

* * * * *